March 27, 1956    M. E. DUNKELBERGER ET AL    2,739,767
SPINNING REEL SPOOL BRAKE
Filed April 20, 1954
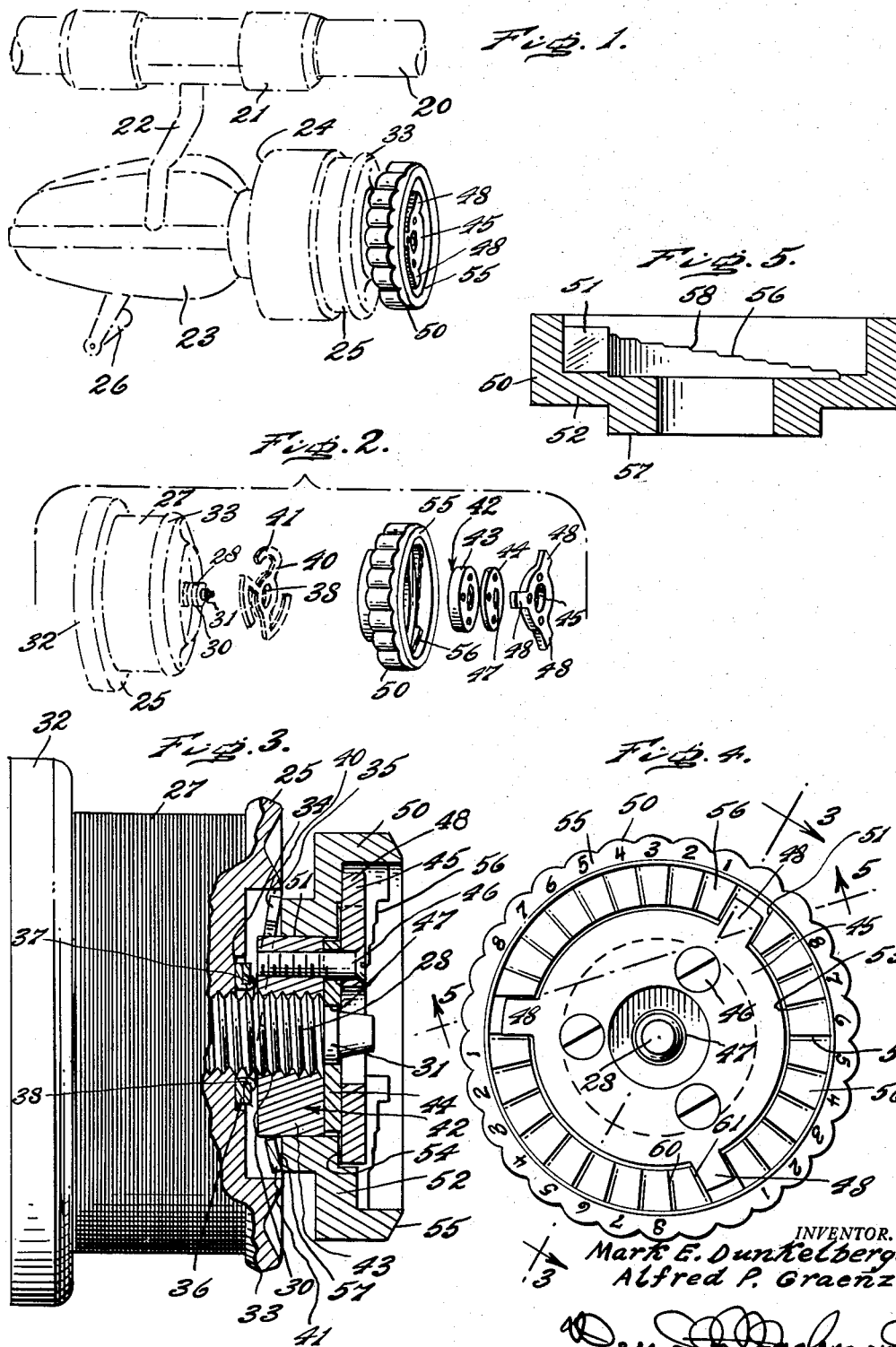
INVENTOR.
Mark E. Dunkelberger.
Alfred P. Graenz.
BY
ATTORNEYS.

United States Patent Office 2,739,767
Patented Mar. 27, 1956

2,739,767

SPINNING REEL SPOOL BRAKE

Mark E. Dunkelberger, Churchville, and
Alfred P. Graenz, Southampton, Pa.

Application April 20, 1954, Serial No. 424,362

8 Claims. (Cl. 242—156)

The present invention relates to spinning reels of the character which are used by fishermen, and particularly to more accurate braking adjustments.

A purpose of the invention is to permit a step-by-step brake adjustment with indication of the particular adjustment position on the front of the reel.

A further purpose is to permit the substitution of the usual wing nut on a spinning reel by an adjustment nut and collar combination which has one or preferably a plurality of dogs on a nut cooperating with one or preferably a plurality of steps on a collar to indicate the adjustment position.

A further purpose is to secure the nut in a limiting position on the spindle and thus establish a fixed axial position for the dogs.

Further purposes appear in the specification and in the claims.

In the drawings we have chosen to illustrate one only of the numerous embodiments in which our invention may appear, selecting the form shown from the standpoints on convenience in illustration, satisfactory operation and clear demonstration of the principles involved.

Figure 1 is a fragmentary perspective of a fishing rod and spinning reel shown in phantom, embodying the brake adjusting mechanism in accordance with the present invention.

Figure 2 is an exploded perspective of the spool and brake components of Figure 1, showing the spool, spindle, and spring in phantom.

Figure 3 is an enlarged side elevation of the spool, spindle assembly and brake parts in accordance with the present invention, the brake components being shown in axial section on the line 3—3 of Figure 4.

Figure 4 is a front elevation of the brake collar and nut in accordance with the invention.

Figure 5 is a section through the brake collar on the line 5—5 of Figure 4.

Describing in illustration but not in limitation and referring to the drawings:

Many fishermen prefer to use the spinning type reel which has the reel mounted with its axis extending longitudinally of the fishing rod rather than transversely as in older practice. The braking has generally been provided by a prong spring acting between the spool rotating on the stationary spindle assembly, and a wing nut which engages the opposite side of the spring. The practice has been to adjust the brake by jerking on the line and observing the pay-out of the line, attempting to set the brake at a position which is below that at which the line might break, but adequate to give considerable retardation on pay-out. Unfortunately this method of setting is very crude, and results in improper braking adjustment, with loss of fish either because the line does not provide sufficient retardation, and the fish is able to slip the hook, or because the retardation is so great that the line is broken.

The present invention is designed to permit accurate predetermined adjustment of braking, and variation of braking to a predetermined level. Thus with the present invention the fisherman can be sure that he has the proper brake setting for the type of line he is using and the type of fishing in which he is engaged.

The invention is applicable as an attachment to existing reels, and also as part of the structure of new reels.

We illustrate in Figure 1 a fishing rod 20 having a reel mounting 21 which supports a reel bracket 22 which mounts a housing 23, supporting a spindle assembly 24 on which a spool 25 is supported, to be turned by suitable gearing driven by handle 26. The usual pay-out guides and accessories are eliminated from the showing, in order to simplify the illustration.

The spool mounts the line 27 as well known, to be payed out longitudinally of the spool axis.

The spindle assembly includes the usual spindle base beneath the base of the spool (not shown), and a spindle proper 28 having threads 30 near the outer end and having a reduced shouldered outer end portion 31. The spindle assembly is preferably of the usual type in which you can remove the spindle assembly bodily by pushing in on the end of the spindle, releasing a latch not shown.

The spool has a base flange 32 and a front flange 33, the front flange having a brake spring washer recess 34 near the center, and a brake spring recess 35 both in the front end extending to a larger diameter. The usual brake spring as shown comprises a hub washer 36 which is in the recess 34 and is spun at 37 to pivotally mount the hub portion 38 of the spring, having radially extending arms 40 which carry near their outer ends circumferentially extending and axially diverging prongs 41 which are each deflected axially in the same direction and exert an axial spring action to provide a braking action.

The usual wing nut is not employed in the present invention, but instead a nut 42, conveniently made in separate parts, is applied on the spindle. The nut comprises a nut hub portion 43 which has female threads engaging the threads on the spindle, a limiting washer portion 44 and a dog portion 45 on the end of the nut remote from the spool. These three portions are united by screws 46 extending axially.

The washer portion 44 has a central opening 47 which is of a diameter to seat into and engage the shoulder formed by the reduced end 31 on the spindle, thus locking the nut against movement once it is screwed on the spindle as shown in Figure 3.

The dog portion 45 has preferably at three equally circumferentially spaced positions dogs 48 which extend outwardly beyond the hub and the washer.

The hub and the washer are surrounded and engaged by a collar 50 which has a body portion surrounding and conforming to the outer contour of the hub of the nut at 51. The collar then has an outwardly extending flange portion 52 which extends beyond a cylindrical overhanging portion 53 of the dog portion of the nut, the collar being recessed at 54 to receive this overhanging portion. At the circumferential outer edge the collar has a dial flange 55 which extends axially beyond the dogs.

Each of the dogs at any setting engages one of a sequence of arcuately disposed steps 56, each step corresponding to a different axial position of the collar, of which the end 57 engages the prongs of the spring. As shown there are eight steps 56 and each of the axially different steps is numbered on the dial and corresponds to a different arcuate relation between the dogs 48 and the steps. The highest step has a stop 60 which prevents the dog from turning too far in one direction, and the lowest step abuts at the other end against a stop 61 which prevents the dog from moving too far in the opposite direction.

In operation, the spinning reel can be converted from a standard type of brake to the brake of the present invention by replacing the usual wing nut by the nut and collar assembly of the present invention. The nut is screwed down until the washer engages in the shouldered portion 31 on the spindle holding the nut in a predetermined position. With the dogs on the unnumbered lowest step as shown in Figure 4. the collar is positioned fully to the right in Figure 3 and the spring has the latest brake setting. This is sufficient so that the spool pawl engages the spindle. To increase the brake setting it is merely necessary to grasp the dial and turn until the dogs engage the desired numbered steps, for example step 4. Slight slopes 58 on the downwardly facing ends of the steps enable the dogs to slide up to the next step as the dial turns. This tightens the brake setting to a predetermined value, which can be established by experts for the particular fishing line and type of fishing.

The user can adjust the correct tension on the brake for a particular line and spool, and keep it thus adjusted, since he can replace the spindle assembly by manipulating the spindle to release it, and can apply a new spindle assembly already adjusted. The spool and brake are then set for the correct adjustment the next time they are used.

The distance from step 1 to step 8 on the brake of the present invention preferably equals about 5 turns on the usual wing nut.

The user cannot adjust too far in any direction, as he is prevented by stop 60 or stop 61.

Accordingly, the invention is believed to find its widest application as a means of assuring correct braking notwithstanding changes in spools.

In view of our invention and disclosure variations and modifications to meet individual whim or particular need will doubtless become evident to others skilled in the art, to obtain all or part of the benefits of our invention without copying the apparatus shown, and we, therefore, claim all such insofar as they fall within the reasonable spirit and scope of our claims.

Having thus described our invention what we claim as new and desire to secure by Letters Patent is:

1. In a spinning reel, a threaded spindle assembly, a spool turnable on the spindle assembly, a spring having an outwardly extending and axially diverging prong surrounding the spindle on one side of the spool, a nut threaded on the spindle assembly on the side of the spring remote from the spool, having a hub portion located radially inside the spring prong, and having a dog extending radially out beyond the hub portion, and a brake adjusting collar surrounding the hub portion of the nut between the spring and dog, engaging the spring prong at one end and having a plurality of brake tensioning steps successively engaging the dog and each located at a different axial position with respect to the surface of the collar which engages the spring prong.

2. A spinning reel according to claim 1, in which the spindle has a reduced shoulder engaging the end of the nut beyond the thread and limiting the screwing of the nut on the spindle.

3. A spinning reel according to claim 1, in which the collar has a dial for indicating the adjustment positions of the collar with respect to the dog.

4. A spinning reel according to claim 1, in which the spring has a plurality of prongs, and there are a plurality of sets of steps on the collar and a plurality of cooperating dogs on the nut.

5. A spinning reel according to claim 4, in which the collar has stops engaging the dogs at one angular position.

6. In a spinning reel, a nut adapted to engage the spindle of a spinning reel, a dog radially extending from one end of the nut, a collar surrounding and engaging the portion of the nut located to one side of the dog, having an end surface at right angles to the axis of the collar and having a plurality of radially distributed steps, each at a different axial position on the collar and each engaging the dog in a different arcuate position of the collar and thereby holding the collar in a different axial position with respect to the nut.

7. A spinning reel according to claim 6, having an abutment on the nut at the end provided with the dog adapted to limit the position of the nut by engaging a shoulder on the spindle and extending radially inwardly beyond the thread.

8. A spinning reel according to claim 7, having a stop on the collar which engages the dog in one relative angular position.

References Cited in the file of this patent

UNITED STATES PATENTS 2,229,470  Pezon _____ Jan. 21, 1941

FOREIGN PATENTS 471,218  Great Britain _____ Oct. 31, 1937